United States Patent [19]
Balfour

[11] Patent Number: 6,097,290
[45] Date of Patent: Aug. 1, 2000

[54] ENTRANCE ACTUATED LIGHTING ACTIVATION SYSTEM

[76] Inventor: Gilbert A. Balfour, 3240 SW. 66th Ave., Miramar, Fla. 33023

[21] Appl. No.: 09/232,623

[22] Filed: Jan. 19, 1999

Related U.S. Application Data

[60] Provisional application No. 60/072,295, Jan. 23, 1998.

[51] Int. Cl.[7] .................................................. G08B 13/08
[52] U.S. Cl. ................................ 340/545.1; 340/686.1; 315/84
[58] Field of Search ........................... 340/545.1, 545.2, 340/547, 541, 542, 686.1; 315/84

[56] References Cited

U.S. PATENT DOCUMENTS

| | | | |
|---|---|---|---|
| 3,221,211 | 11/1965 | Murphy et al. | 315/84 |
| 3,722,615 | 3/1973 | Okada et al. | 180/281 |
| 3,964,044 | 6/1976 | Busco | 340/521 |
| 4,058,740 | 11/1977 | Dalton et al. | 307/116 |
| 4,122,371 | 10/1978 | Talmage et al. | 315/84 |
| 4,427,975 | 1/1984 | Kinzie | 340/547 |
| 4,894,643 | 1/1990 | Thompson et al. | 340/593 |
| 5,226,257 | 7/1993 | Moss | 49/13 |
| 5,282,337 | 2/1994 | Duhame et al. | 49/199 |
| 5,289,162 | 2/1994 | McDaniel | 340/521 |
| 5,357,169 | 10/1994 | Toyozumi et al. | 315/77 |
| 5,451,930 | 9/1995 | McDaniel | 340/521 |
| 5,455,562 | 10/1995 | Chin | 340/547 |

*Primary Examiner*—Benjamin C. Lee
*Attorney, Agent, or Firm*—Oltman, Flynn & Kubler

[57] ABSTRACT

A entrance actuated lighting activating system wherein a control logic system is used to activate and de-activate the area lighting of a room by monitoring the entrance door in order to detect when people enter or leave the room.

8 Claims, 1 Drawing Sheet

ENTRANCE ACTUATED LIGHTING ACTIVATION SYSTEM

RELATED APPLICATION

The present application is a continuation of the Disclosure Document Ser. No. 421,113, filed on Apr. 23, 1997, and Provisional Application No. 60/072,295 filed on Jan. 23, 1998.

BACKGROUND OF THE INVENTION

1. Field of the Invention

The present invention relates generally to electrical switches used to control area lighting in rooms of buildings or the like, and more specifically to a switching system that automatically activates the lighting system within the room by monitoring the opening and closing of entranceway door(s) of the room in order to determine the presence of a person therein.

2. Descriotion of the Related Art

A search of the prior art did not disclose any patents that read directly on the ciaims of the instant invention; however, the following references were considered related:

U.S. Pat. No. 5,451,930 issued to Steven M. McDaniel;
U.S. Pat. No. 5,357,169 issued to Morihiko Toyozumi et al.;
U.S. Pat. No. 5,289,162 issued to Steven M. McDaniel;
U.S. Pat. No. 5,282,337 issued to Duhame et al.;
U.S. Pat. No. 5,226,257 issued to Richard D. Moss;
U.S. Pat. No. 4,894,643 issued to Herbert A. Thompson;
U.S. Pat. No. 4,427,975 issued to James E. Kinzie;
U.S. Pat. No. 4,122,371 issued to Dennis D. Talmage et al.;
U.S. Pat. No. 3,722,615 issued to Masashi Okada et al.; and
U.S. Pat. No. 3,221,211 issued to Robert M. Murphy et al.;

While several features exhibited within these references are incorporated into this invention, alone and in combination with other elements, the present invention is sufficiently different so as to make it distinguishable over the prior art

SUMMARY OF THE INVENTION

The present invention consists of an entrance actuated lighting activation system that is used to automatically switch area lighting systems in a room or similar structure by monitoring activity through the entranceway thereof. The device consists of a logic circuit containing a series of limit switches, electro-mechanical relays and control switches wired in a manner so as to activate the lighting system when a person enters the room and deactivate the lighting system when the person exits the room.

It is therefore an object of the present invention to activate the area lighting system of a room or the like upon the initial opening of the entrance door.

It is another object of the present invention for the area lighting system to remain activated when the door is closed within a time of a sufficient duration to allow a person to enter the room from the outside.

It is another object of the present invention for the area lighting system to remain activated when the door is left ajar subsequent to a person entering the room from the outside.

It is another object of the present invention for the area lighting system to de-activate when the person exits the room, the door having been left open throughout the duration of the person's presence in the room.

It is another object of the present invention for the area lighting system to de-activate when the person exits the room, the door having been left closed throughout the duration of the person's presence in the room.

Finally, It is an object of the present invention to allow for a manual override in which a conventional wall switch can be used to force the lighting system to remain active, regardless of doorway activity or the presence of a person in the room.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| LIST OF REFERENCE FIGS. AND NUMBERS | |
|---|---|
| LS1 | Proximity Sensing Limit Switch |
| CR1 | Latching Control Relay |
| CR2 | Timer Control Relay |
| CR1a | Latching Control Relay First Normally Opened Contact |
| CR1b | Latching Control Relay Second Normally Opened Contact |
| CR1c | Latching Control Relay Third Normally Opened Contact |
| CR2a | Timer Control Relay Normally Opened Contact |
| CS1 | Manual Override Control Switch |
| L1 | Area Lights |
| 5 | Entrance Actuated Lighting Activation System |
| 10 | Positive/Hot Power Supply Circuit |
| 11 | Negative/Neutral Power Supply Circuit |
| 12 | Proximity Sensing Limit Switch Table |
| 13 | Door Position Axis |
| 14 | Switch Position Axis |
| 15 | Switch Position Indicating Line |

DESCRIPTION OF THE PREFERRED EMBODIMENTS

1. Detailed Description of the Figures

Figure 1:
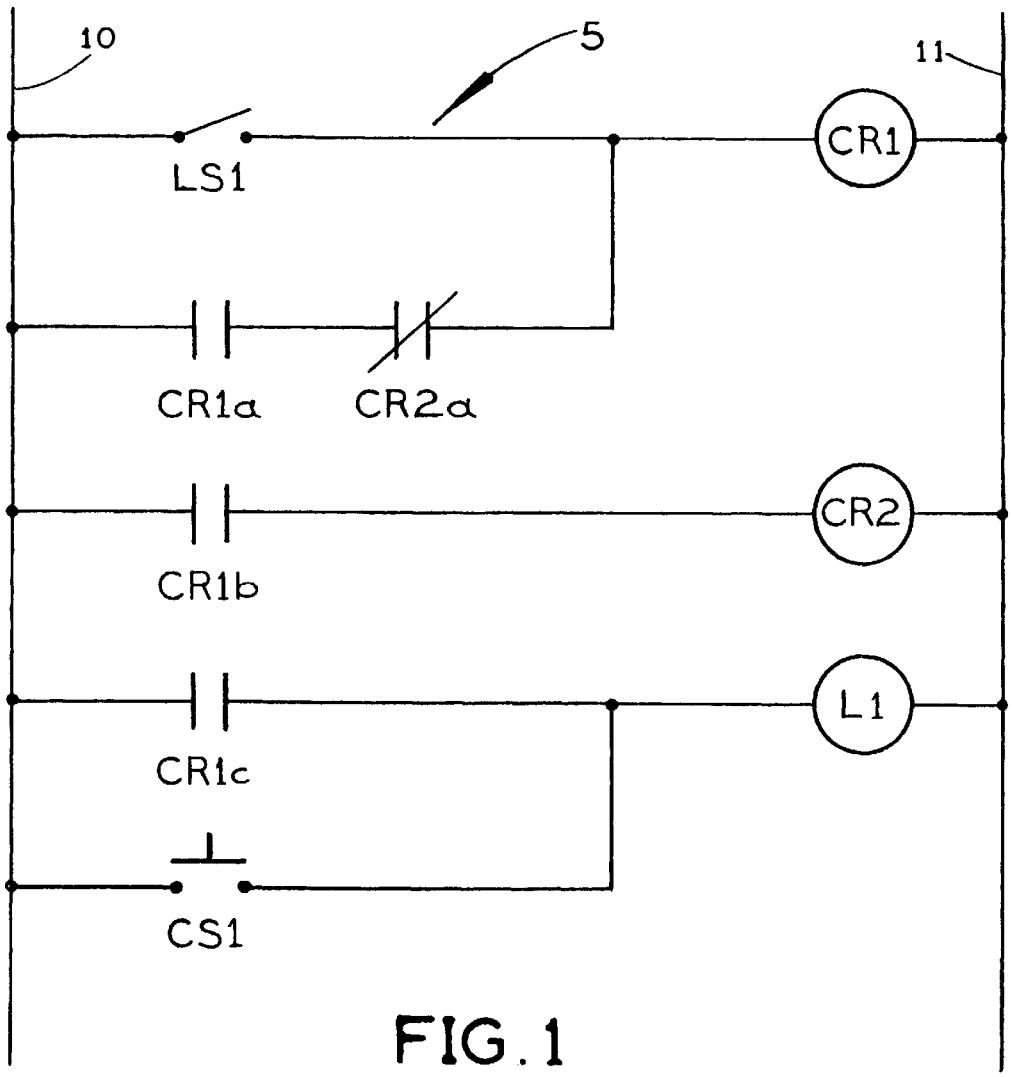
FIG. 1 is a ladder-type logic diagram that depicts the wiring scheme and operation of the entrance actuated lighting activating system.

Referring now to FIG. 1, depicted is a ladder-type logic diagram that indicates wiring scheme and operation of the entrance actuated lighting activating system 5, hereinafter referred to as activating system. The activating system 5 can be configured to operate on building power, typically 110 volts alternating current (110 VAC), or it can be powered by a low voltage direct current, such as 24 volts direct current (24 VDC) or 48 VDC supplied by a rectifying transformer powered with building power. The positive/hot power supply circuit 10 (positive supply) and the negative/neutral power supply circuit 11 (negative supply) are depicted as vertical leads. The electrical circuits between the positive supply 10 and the negative supply 11 contain the various limit switches, control relays and contacts that perform logical interpretations of existing conditions relating to the entrance doorway and react accordingly by actuating the lighting system.

The proximity sensing limit switch LS1 (proximity switch) is used to monitor the position of the door leading into the room whose lighting system is being controlled.

Figure 2:
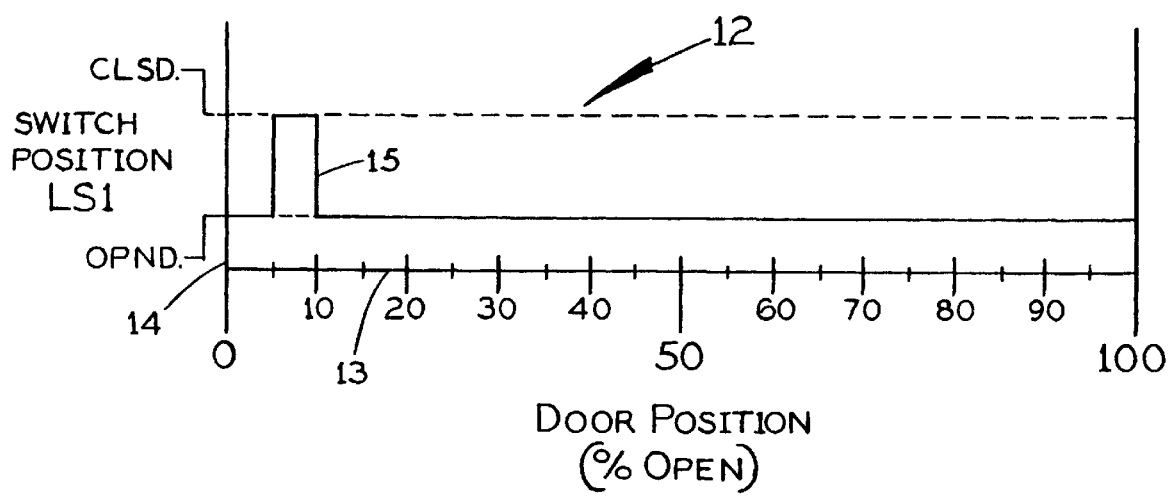
FIG. 2 is a switch table that depicts the functionality of the proximity sensing limit switch used by the entrance actuated lighting activation system.

Referring now to FIG. 2, the proximity sensing limit switch table 12 (table) shows a graphical representation of the operation of the proximity switch LS1 in relation to the door position. The door position is indicated along the door position axis 13 and the switch position is indicated on the switch position axis 14. A switch position indicating line 15 depicts the switch position, i.e. opened or closed, at any given door position, i.e. from 0 to 100% opened. As shown on the table 12, the proximity switch LS1 is closed when the door is between 5–10% opened. The proximity switch LS1 is opened when the door is between 0–5% opened and between 10–100% opened. As a result of this configuration, closure of the proximity switch LS1 will occur each time the door is opened or shut and is used to indicate such to the activation system 5.

Now, referring back to FIG. 1, the latching control relay CR1 is a latching electro-mechanical relay wherein, upon energizing the relay coil, its relay contacts latch in the "energized" position until the relay coil is de-energized and energized again, at which time the relay contacts latch in the "de-energized" position. As a result, the latching control relay CR1 repeatedly latches in the energized and de-energized position as the relay coil is successively energized with periods of de-energizing in between.

The timer control relay CR2 is an electro-mechanical relay with a built-in timing circuit that, upon energizing the circuit, delays energizing the relay coil for an adjustable time period. Once the time period expires and the relay coil is energized, the relay contacts are engaged in the "energized" position until the relay coil is de-energized.

The latching control relay first normally opened contact CR1a (first normally opened contact), latching control relay second normally opened contact CR1b (second normally opened contact) and latching control relay third normally opened contact CR1c (third normally opened contact) are sets of electrical contacts, i.e. switches, that close upon energizing the latching control relay CR1. The timer control relay normally closed contact CR2a (normally closed contact) is a set of electrical contacts, i.e. a switch, that opens upon energizing the timer control relay CR1.

The area lights L1 consist of the light or lights that are to be controlled automatically by the activating system 5. The manual override control switch CS1 (manual switch) consists of a wall mounted switch used to override the activating system 5, bypassing the control circuit and activating the lights.

2. Operation of the Preferred Embodiment

According to the preferred embodiment, the proximity switch LS1 will provide a momentary closure each time the entrance door is either opened or closed. Upon opening the door, the latching control relay CR1 will energize momentarily due to the momentary closure of the proximity switch LS1, latching in the "energized" position. Upon the latching of CR1, the first normally opened contact CR1a closes, the second normally opened contact CR1b closes and the third normally opened contact CR1c closes. Closure of the third normally opened contact CR1c immediately activates the area lights L1. Closure of the second normally opened contact CR1b begins the timer period of the timer control relay CR2. Closure of the first normally opened contact CR1a "seals-in", or maintains, the power to the latching control relay CR1 thereby preventing unlatching of the latching control relay CR1 if the proximity switch LS1 is actuated. Upon the expiration of the timer period, the timer control relay CR2 energizes and the normally closed contact CR2a opens thereby removing the "sealing-in" of the power to the latching control relay CR1, allowing it to be un-latched if the proximity switch LS1 is actuated.

As a result of the operation of the above described activation system 5, a typical operational scenario hereinafter follows:

As the room is entered, opening of the door causes the energizing and latching of the latching control relay CR1 thereby activating the area lights L1, initiating the timer of the timer control relay CR2 and "sealing-in" power to the latching control relay CR1. The "sealing-in" of the latching control relay CR1 allows the door to be shut, i.e. the proximity switch LS1 can be actuated, prior to the expiration of the timer period, without de-activating the area lights L1. Once the timer period has expired and the latching control relay CR1 is no longer sealed in, opening or closing the door, i.e. closing the proximity switch LS1, will un-latch the latching relay CR1 causing the area lights L1 to be de-activated.

Thus, upon entering the room, the area lights L1 are activated. If the person entering the room closes the door within the preset time of the timer control relay CR2, the area lights L1 remain activated until the user opens the door to leave the room. If the person entering the room leaves the door open past the preset time of the timer control relay CR2, the area lights L1 remain activated until the person leaves the room and closes the door.

What is claimed is:

1. An entrance actuated lighting activating system for use in a building having an entrance door and a lighting source, said lighting activating system including an electrical logic circuit comprising:

a proximity sensing limit switch electrically connected to a power source and joined to said entrance door such that said proximity sensing limit switch is operated by opening and closing said entrance door;

a latching control relay having a first normally opened contact, a second normally opened contact, a third normally opened contact and a first energizing coil, said first energizing coil being electrically connected to and supplied with electrical power from said power source upon closure of said proximity sensing limit switch, said latching control relay having a latched energized position and a latched non-energized position and an unlatched position;

a timer control relay having a timer period having a normally closed contact and a second energizing coil, said second energizing coil being electrically connected to and supplied with electrical power from said power source upon closure of said second normally opened contact; and a sealing circuit connected in parallel with said proximity sensing limit switch and comprising said first normally opened contact connected in series with said normally closed contact.

2. The lighting activating system described in claim 1, wherein said proximity sensing limit switch provides a momentary closure each time said entrance door is opened or closed, for momentarily delivering power from said power source to said latching control relay.

3. The lighting activating system described in claim 1, wherein opening said entrance door causes said proximity sensing limit switch to close, and closing said proximity sensing limit switch causes said latching control relay to energize momentarily, and causes said latching control relay to latch in said latched energized position.

4. The lighting activating system described in claim 1 wherein, when said latching control relay is latched in said latched energized position, said first normally opened contact closes, said second normally opened contact closes and said third normally opened contact closes.

5. The lighting activating system described in claim 1, wherein closure of said first normally opened contact maintains power from said power source to said latching control relay thereby preventing unlatching of said latching control relay in the event that said proximity sensing limit switch is closed.

6. The lighting activating system described in claim 1, wherein closure of said second normally opened contact activates said timer control relay and thereby begins the timer period of said timer control relay.

7. The lighting activating system described in claim 1, wherein closure of said third normally opened contact immediately activates said lighting source.

8. The lighting activating system described in claim 1, wherein, upon the expiration of said timer period, said timer control relay energizes and said normally closed contact opens, thereby removing power to said latching control relay and thereby permitting said latching control relay to take its unlatched position upon closure of said proximity sensing limit switch.

* * * * *